March 4, 1958  W. F. STEINEN  2,825,506
DRAFT REGULATOR
Filed May 11, 1953  2 Sheets-Sheet 1
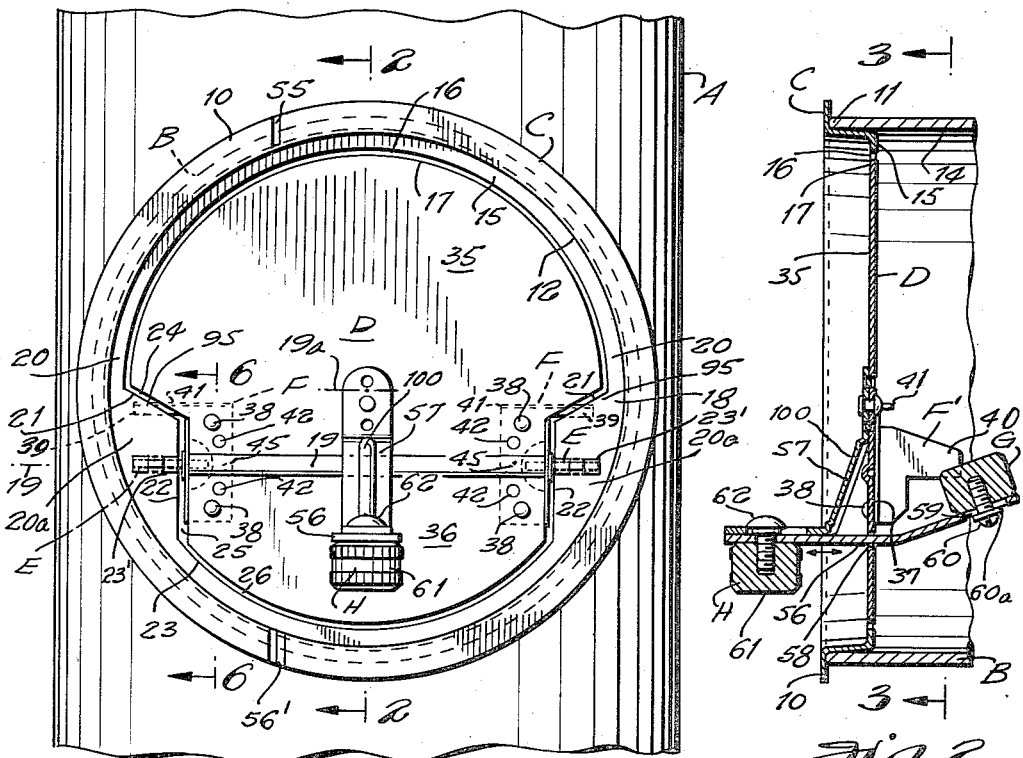
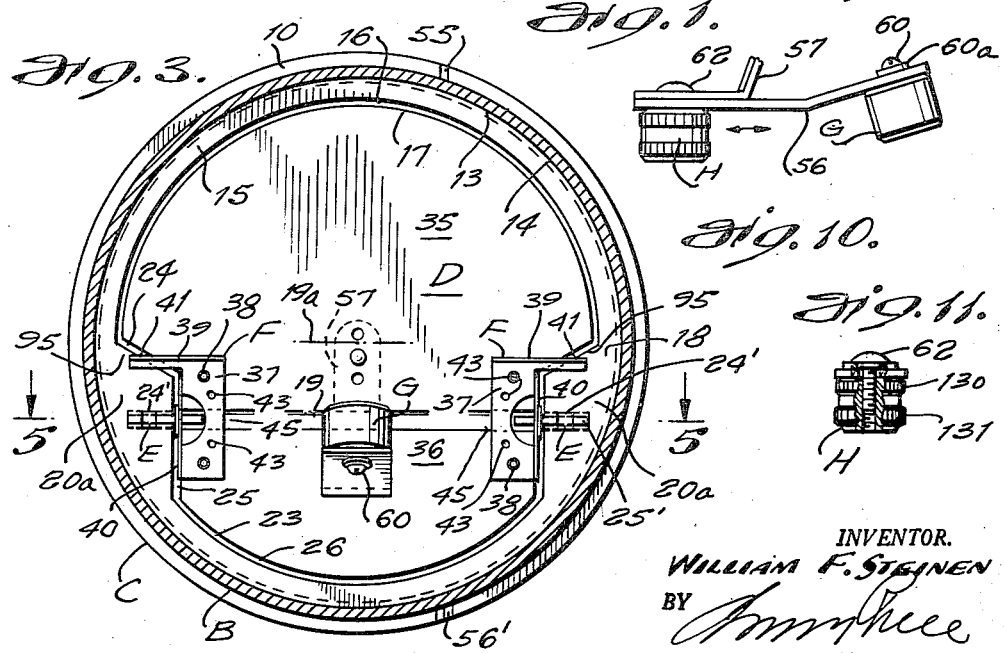
INVENTOR.
WILLIAM F. STEINEN
BY
ATTORNEY March 4, 1958 W. F. STEINEN 2,825,506
DRAFT REGULATOR
Filed May 11, 1953 2 Sheets-Sheet 2
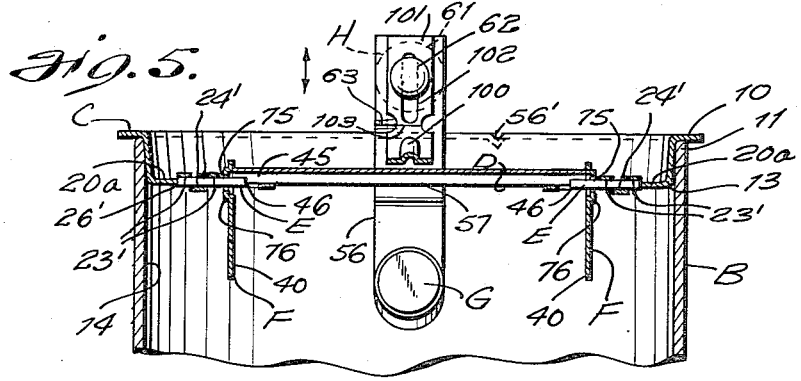
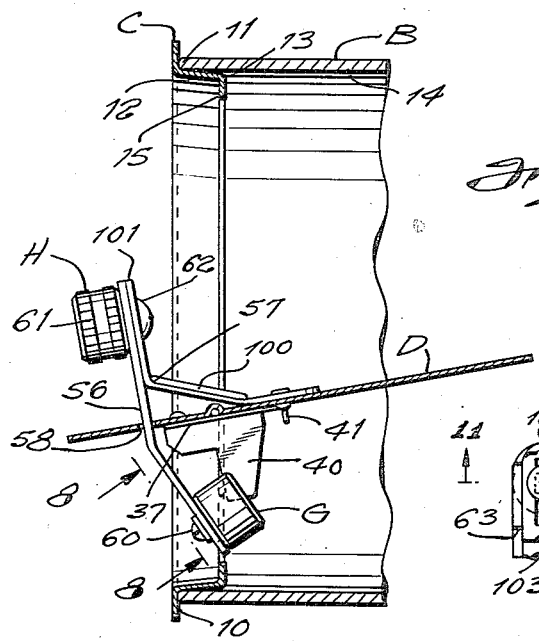
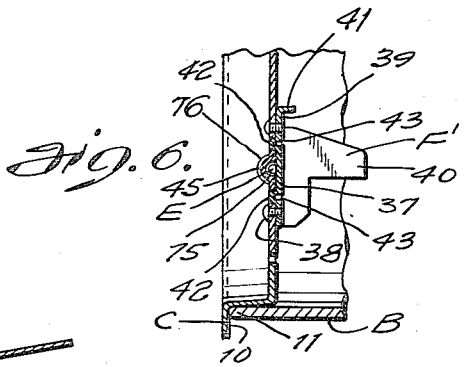
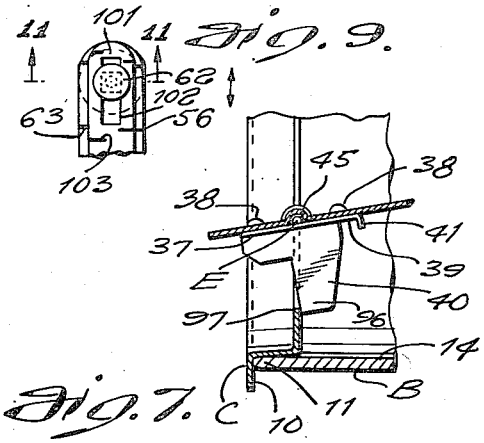
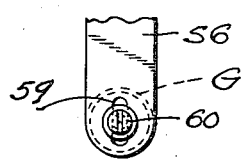
INVENTOR.
WILLIAM F. STEINEN
BY
ATTORNEY

United States Patent Office 2,825,506
Patented Mar. 4, 1958

2,825,506

DRAFT REGULATOR

William F. Steinen, Springfield, N. J.

Application May 11, 1953, Serial No. 354,267

4 Claims. (Cl. 236—45)

The present invention relates to a draft regulator, and it particularly relates to a novel draft regulator to be used either in the home, factory or office in connection with heating and ventilating systems.

It is among the objects of the present invention to provide a novel draft regulator or draft control which will be of low cost and provide reliable control, which will have a high relief capacity, which may be readily installed without excessive cost or a requirement of highly skilled labor and which will be attractive in appearance.

Another object is to provide an accurately calibrated draft control or draft regulator device which may be readily adjusted and accurately set to operate effectively over a considerable range, and which is designed to be utilized in connection with the usual types of ventilating or draft conduits.

A further object is to provide a draft regulator which may be universally employed in connection with heating and power boilers, domestic heating plants, and heating appliances in general, and which may be readily mounted in suitable openings, in flue risers, smoke breeching equipment, for the purpose of automatically regulating or controlling the draft in the combustion chambers and such equipment to effect more complete combustion of the fuel and greater absorption of heat from the combustion gases.

Still another object is to provide a draft controller or draft regulator which will operate most effectively and reliably regardless of variations in stack or chimney drafts, changing weather conditions, winds, barometric pressure and outside temperature differences, and which will not permit too much air to be drawn into the combustion chamber.

A further object of the present invention is to provide a simple, inexpensive, readily installed regulator of high sensitivity and operating efficiency, which assures economic operation of the heating equipment with which it is used, of compact form, so little space is required for its installation and for its shipment and storage, and of sturdy and rugged construction, which gives it a long service life without requiring constant attention.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory, according to one embodiment of the present invention, to provide a circular, dished draft supporting frame work which may be readily mounted upon any suitable thimble or circular opening, or which may be readily associated with any flue or cylindrical air conduit by a simple collar, tube or thimble.

A particular feature of the present invention resides in the fact that there is provided a swinging draft regulator door or vane which is pivotally mounted or hinged well below the center of the vane upon the draft regulator housing ring or mounting annulus.

In a preferred form of the invention the hinge construction consists of a fixed rod or shaft extending partly or all the way across the opening for the swinging vane or door.

The openings which suspend or hang the vane upon the fixed split or continuous shaft are so designed that the hinge connections will give a line-contact and will be self-cleaning as the vane or door swings from opened to closed position and vice versa. This will reduce friction to a minimum, giving the swinging vane a high degree of sensitivity.

Desirably the lower portion of the vane or door is of reduced width and weight so the maximum weight of the swinging vane will be above the hinge or pivot connection.

A particular feature of the present invention resides in the adjustment which consists of a sliding weighted bar having weights at both ends of the bar, which extends transversely to the plane of the vane, and which is adjustable in respect to the spacing of the weights from the vane. By adjusting both weights simultaneously, there is avoided unbalancing of the vane and loss in sensitivity as occurs when only the forward weight is adjustable.

Desirably this adjusting weighted bar is mounted upon a slotted bracket which extends downwardly and forwardly from the front of the swinging vane to hold said weighted bar substantially below the hinge or pivot mount. This construction is particularly suitable for quick and accurate adjustment of the draft regulator vane to the requirement of the particular installation on which it is placed.

Desirably the two weights are simultaneously adjusted forwardly or backwardly in respect to the vane to give a desired adjustment of balance of the vane, but are fixed in respect to the adjustment bar.

The forward weight is knurled and mounted on a threaded member and serves both as an adjustment handle and to lock the bar in adjusted position.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a front elevational view of one form of draft regulator, according to the present invention, mounted upon a conduit.

Fig. 2 is a transverse fragmentary vertical sectional view upon the line 2—2 of Fig. 1.

Fig. 3 is a rear elevational view partly in section of the back of the draft regulator, mounted upon a collar for connection to a flue.

Fig. 4 is a side sectional view similar to Fig. 2, showing the vane in open position.

Fig. 5 is a horizontal transverse sectional view taken upon the line 5—5 of Fig. 3.

Fig. 6 is a fragmentary transverse vertical sectional view taken upon the line 6—6 of Fig. 1, showing the vane stop in its uppermost position.

Fig. 7 is a fragmentary transverse vertical sectional view similar to Fig. 6, showing the stop in its lowermost position with the vane open.

Fig. 8 is a fragmentary bottom elevational view of the inside or rear end of the adjusting lever.

Fig. 9 is a fragmentary top view at the forward end of the supporting bracket and adjustment bar showing an alternative system of graduations.

Fig. 10 is a schematic side elevational view of an alternative form of adjusting lever with both weights mounted on the lower side of the lever.

Fig. 11 is a side elevational view upon the line 11—11 of Fig. 9.

Referring to Figs. 1 to 8, there is shown a vertical flue or conduit A having a connection B which may receive the frame or housing C and the rotating vane D.

Fixed to the housing and frame are two stub pivot shafts E which engage the bearing plates F mounted upon the swinging vane D. The vane D carries the rear weight G and the forward weight H.

The collar or frame C consists of an outside flange 10 which abuts up against the end 11 of the connection B. The frame is also provided with an inturned flange 12 which closely fits at 13 inside of the outer end face 14 of the T connection B.

Inturned from the flange 12 is the peripheral or concentric section 15 which, as indicated best in Figs. 1 and 4, has a spacing 16 from the upper peripheral edge 17 of the vane D. This short peripheral flange section 15 extends downwardly on each side to a point 18 at or adjacent the hinge line 19. The hinge line 19 is substantially below the geometrical center line 19a of the vane D.

The peripheral flange as is best shown in Figs. 1 and 4 then extends downwardly as indicated at 20 and has an oblique inwardly extending edge 21 and a vertical edge 22.

The edge 22 then extends downwardly to the circular portion 23. The spacing 16 is maintained at 24, 25 and at 26 around the entire periphery of the vane D so that the vane D will be spaced from the flange 15—20 all around its periphery.

From the structure of the enlarged frame portions 20a there are stamped out two forwardly extending straps 23' and one rearwardly extending strap 24' (see Figs. 1 and 5), into which the ends 25' of the stub shafts E are fixedly mounted.

The ends 25' of the stub shafts E abut the edge 26 in the enlarged portion 20a, as shown in Fig. 3.

The vane D will have a circular top portion 35 and a reduced width lower portion 36. The lower sides of the vane D below the center line 19a will receive the base flanges 37 of blaring plates F.

These base flanges 37 are riveted on the vane D at 38. Both flanges 37 carry the sidewardly extending stop extensions 39 with the bent over edges 41.

Each bearing plate F, as shown in Fig. 2, also has a rear extension 40.

Between the rivet connections 38 there may be provided the location embossments 42 fitting into openings 43 (see Figs. 1 and 3).

In Fig. 3, the metal of the base flange 37 is extruded as indicated at 43 to fit into the openings 42 (see Fig. 1) in the vane D.

As shown best in Fig. 5, the vane plate D will be recessed as indicated by 45 so that it will clear the ends 46 of the stub shaft E.

The periphery of the housing C is provided with a notch 55 and an alignment groove 56' (see Fig. 1).

The weighted adjustment graduated bar 56 is mounted by the bracket 57 and extends through a slot 58 in the vane D, as shown in Fig. 2.

At the rear end, the bar 56 carries the fixed weight G. This weight G is held in position by a screw 60 extending through the slot or hole 59, as shown in Fig. 2.

The outside end of the graduated bar 56 on the other side of the vane plate D has a weight 61. The weight 61 is mounted by the screw bolt 62 on the bar 56 and the bar 56 with the weights G and H may be positioned in any adjusted position, being clamped in position by the screw 62, as shown in Figs. 2 and 11. The knurling 130 and 131 will enable loosening and tightening of the weight H.

By adjusting the bar 56 forwardly and backwardly by loosening or tightening the weight H, it is possible to adjust and regulate the balance of the vane D.

The screw 62 and weight H when tightened thereon will hold the sliding weighted bar 56 in any adjusted position. If desired, a lock washer may be utilized to assure that the weight H will not become loose on the screw 62.

The graduation 63' on the upper face of the bar 56 will enable correct determination of the proper position of the sliding weight 61 (see Fig. 9).

A limited adjustment is also possible by loosening the screw 60 together with the lock washer 60a which will permit an adjustment of the weight G by the slot 59, as shown in Fig. 2.

The bracket 57 has a ribbed oblique portion 100 and a base portion 101 provided with the adjusting slot 102 and it carries a corresponding graduation line 103 to correspond with the graduation 63 forwardly extending portion of the adjustment bar 56, as shown in Figs. 4, 5 and 9. The alternative graduations 63' and 103' (Fig. 9) will be equally effective.

The stub shafts E as shown in Fig. 6 fit in eccentric openings 75 in the extensions 76 of the bearing plates F.

The swinging movement of the vane D will be stopped in closed position by the stop extensions 39 which extend to the side and overlap the flange portions 20a.

These extensions 39 will act as stops against the upper edge portions 95 of the enlargement 20a when the vane D is in closed position, as shown in Fig. 3. In open position the lower corner 96 of the bearing plate extension 40 will strike the lower peripheral edge 97 of the casing structure or annulus C, as indicated best in Fig. 7.

In Fig. 10, an alternative form of adjusting bar 56 is illustrated, in which both weights H on the outside and G on the inside depend or are mounted on the lower side of the bar 56.

Both weights G and H of Figs. 1 to 9 are fixed to the bar 56 so that only the movement of the bar 56 in respect to the vane D will give the desired adjustment.

As indicated in Figs. 10 and 11, the front weight may have serrated portions 130 and 131 for better gripping purposes when locking and unlocking the weight while making an adjustment. The serrations also serve in an ornamental manner.

By this adjustment bar, it is possible to adjust both the front and back weights G and H simultaneously, with each movement of the adjustment bar giving a maximum adjustment effect.

The fixed split hinge rod E together with the eccentric hinge openings renders the hinger connection of the vane self-cleaning.

The adjustment bar 56 renders the swinging vane D highly sensitive, as does also the positioning of the hinge connections of the vane at 19 well below the center of gravity at 19a.

By using the sliding bar 56 and weights G and H as shown in Fig. 2, the regulator may be calibrated (see Fig. 9). The calibration enables a person to adjust the regulator to the draft required without the use of a meter.

In assembly, the thimble B is pressed against the flue A until its contour fits the flue. Two holes are then punched or provided to connect the extensions of the thimble to the sides of the opening in the flue A.

After this has been done, the outline of the connection may be marked upon the flue A and the portion of the flue which is to communicate with the thimble B is removed.

The draft regulator housing C may then be placed upon the end of the thimble B and it may be leveled by the notch 55 and groove 56'.

The sliding bar 56 may then be adjusted by setting the graduating line 103 or 103' in respect to the desired graduation 63 or 63', depending upon where the setting is to be.

After adjustment by tightening the weight H on the screw 62, a permanent setting is obtained.

The draft regulator as shown permits both front and back adjustments with a single, slight movement of the regulator bar 56. This will keep the regulator balanced-sensitive at any setting and it is not necessary to make two settings to achieve balance.

The graduations enable a setting to be made without guessing and repeated trials.

The eccentric hinge openings with the fixed bearing rods or stud shafts give a line contact with very little friction and also give a self-cleaning effect which eliminates and prevents accumulation of soot and dirt.

As many changes could be made in the above draft regulator, and many widely different embodiments of this invention could be made, without departing from the scope of the claims, it is intended that all matter contained in the above description shall be interpreted as illustrative and not in a limiting sense.

Having now particularly described and ascertained the nature of the invention, and in what manner the same is to be performed,

What is claimed is:

1. A draft regulator of the type having an encircling frame enclosure with a swinging vane lying in a vertical plane when closed and having a center of gravity and a geometrical center pivotally mounted to swing into and outside the vertical plane of said enclosure, said enclosure and vane when closed lying in a substantially vertical plane, said vane having horizontal pin pivot connections to the sides of the frame fixed to the frame and said vane having bearing plates extending rearwardly transversely from the plane of the vane pivotally mounted on said pin pivot connections, a horizontal slot in the lower part of the vane spaced well below the pin pivot connections and the center of gravity and geometrical center, a horizontal bar projecting through said slot and extending substantially to the front and to the rear of said vane and adjustable forwardly and rearwardly in respect to said vane, weight members mounted on the front and rear ends of said bar and a supporting bracket permanently attached to the geometrical center of the vane at its upper end extending obliquely downwardly and forwardly of the vane to hold the front end of the bar, the front end of the bar, the front weight member and the lower end of the bracket being provided with an adjustable bolt connection to permit said adjustment.

2. The regulator of claim 1, said plates having rearward and sideward extensions acting as opening and closing stops against said frame.

3. The regulator of claim 1, the lower end of said bracket having a horizontal portion with a central longitudinal slot to receive and permit adjustment of said bolt.

4. The regulator of claim 1, the forward weight being cylindrical and depending from the forward end of the bar and the rearward portion of the bar behind the vane being bent slightly upwardly out of the plane of the forward end of the bar and said rearward weight being positioned on the top thereof.

References Cited in the file of this patent

UNITED STATES PATENTS

| | | |
|---|---|---|
| 123,252 | Eldridge | Jan. 30, 1872 |
| 2,264,590 | Sabins | Dec. 2, 1941 |
| 2,289,579 | Klermund et al. | July 14, 1942 |
| 2,555,687 | Field | June 5, 1951 |
| 2,624,513 | Field | Jan. 6, 1953 |
| 2,652,200 | Field | Sept. 15, 1953 |

FOREIGN PATENTS

| | | |
|---|---|---|
| 217,436 | Switzerland | May 16, 1942 |